US012427727B2

(12) United States Patent
Roussel-Garcia et al.

(10) Patent No.: US 12,427,727 B2
(45) Date of Patent: Sep. 30, 2025

(54) SONOTRODE HAVING COATED INLET PORTION (71) Applicant: HERRMANN ULTRASCHALLTECHNIK GMBH & CO. KG, Karlsbad (DE)

(72) Inventors: Raquel Roussel-Garcia, Pforzheim (DE); Robin Alexander Bode, Pforzheim (DE); Tobias Rosenkranz, Ettlingen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 76 days.

(21) Appl. No.: 18/275,904

(22) PCT Filed: Mar. 2, 2022

(86) PCT No.: PCT/EP2022/055215
§ 371 (c)(1),
(2) Date: Aug. 4, 2023

(87) PCT Pub. No.: WO2022/184750
PCT Pub. Date: Sep. 9, 2022

(65) Prior Publication Data
US 2024/0116253 A1 Apr. 11, 2024

(30) Foreign Application Priority Data
Mar. 4, 2021 (DE) .................. 102021105265.3

(51) Int. Cl.
*B29C 65/08* (2006.01)
*B29C 65/00* (2006.01)

(52) U.S. Cl.
CPC ........ *B29C 66/81422* (2013.01); *B29C 65/08* (2013.01); *B29C 66/8122* (2013.01)

(58) Field of Classification Search
CPC . B29C 65/08; B29C 65/086; B29C 65/81422; B29C 66/8122; B29C 66/73921
(Continued)

(56) References Cited

U.S. PATENT DOCUMENTS 3,867,232 A 2/1975 Thompson et al.
9,931,786 B2 * 4/2018 Herrmann ............ B65B 51/303

FOREIGN PATENT DOCUMENTS

DE 102009026952 A1 12/2010
DE 102014115538 A1 4/2016
(Continued)

OTHER PUBLICATIONS

Japanese Notice of Reasons for Rejection dated Jul. 3, 2025 for corresponding Japanese Application 2023-550222 with English translation.

*Primary Examiner* — James D Sells
(74) *Attorney, Agent, or Firm* — Hudak, Shunk & Farine Co. LPA (57) ABSTRACT

A sonotrode or ultrasonic welding apparatus for ultrasonically processing a material, including a sealing surface adapted to contact the material to be processed, a rear surface opposite to the sealing surface, and a circumferential lateral surface connecting the sealing surface to the rear surface, the lateral surface having two side surfaces arranged substantially parallel to each other and two end surfaces arranged substantially parallel to each other. In order to provide a sonotrode or ultrasonic welding apparatus for processing a material, which at least reduces damage to the material and at the same time does not impair the production speed, it is proposed that the sealing surface has a convexly curved inlet section which adjoins the lateral surface, and wherein the sealing surface has a coating at least in a section.

20 Claims, 5 Drawing Sheets

(58) Field of Classification Search
USPC .................................................... 156/580.2
See application file for complete search history.

(56) References Cited

FOREIGN PATENT DOCUMENTS

| | | |
|---|---|---|
| DE | 102019124006 A1 | 3/2021 |
| EP | 3517278 A1 | 7/2019 |
| JP | 629938 A | 1/1987 |
| JP | H0958621 A | 3/1997 |
| JP | 2018-99883 A | 6/2018 |
| JP | 2019533591 A | 11/2019 |
| WO | 2018073755 A1 | 4/2018 |

* cited by examiner

SONOTRODE HAVING COATED INLET PORTION

FIELD OF THE INVENTION

The present invention relates to a sonotrode for ultrasonic processing of a material, comprising a sealing surface intended to come into contact with the material to be processed, a rear surface opposite the sealing surface, and a circumferential lateral surface connecting the sealing surface to the rear surface, the lateral surface having two side surfaces arranged substantially parallel to each other and two end surfaces arranged substantially parallel to each other.

Usually, the side surfaces and the end surfaces are arranged parallel to each other. However, there are also applications, in particular when several sonotrodes are arranged next to each other in such a way that their end surfaces face each other, in which the end surfaces are not exactly parallel to each other.

Furthermore, the present invention relates to an apparatus for ultrasonic processing of a material with a sonotrode of the type mentioned above, a counter tool with a sealing surface and a material feed. The sealing surface of the counter-tool is arranged opposite the sealing surface of the sonotrode in such a way that the material to be processed can be guided through a gap formed by the two opposite sealing surfaces with the aid of the material feed during processing.

To process a material with ultrasound, the sonotrode of the device is set into ultrasonic vibration. The direction of propagation of the ultrasonic vibration runs between the rear surface and the sealing surface of the sonotrode. The ultrasonic vibration of the sonotrode causes localized heating of the material located in the gap between the sealing surface of the sonotrode and the sealing surface of the counter tool. The localized heating in turn causes the different layers of material arranged in the gap to fuse together and thus form a firm bond that cannot be released without causing damage.

BACKGROUND OF THE INVENTION

Various machining processes using ultrasound are known from the prior art. For example, in one variant the material is moved continuously through the gap between the sonotrode and the counter tool and processed continuously or at specific intervals by the sonotrode. Alternatively, systems are also known in which the material is initially arranged in the gap and the material is not moved for the duration of the ultrasonic machining.

Ultrasound can also be used in particular to weld several layers of material together. In this case, it usually happens that the individual material layers are fed into the gap from different directions, since supply rolls that deliver the materials to the device require corresponding space.

In the course of saving resources, thinner and thus more damage-prone materials are also being used nowadays, which are to be welded together. Typical products manufactured by means of ultrasonic processing are, for example, tubular packaging materials, but also hygiene articles, which are often joined together from several layers of fiber-containing materials.

During ultrasonic processing, special care must therefore be taken to ensure that the feeding and processing of the material does not result in any unwanted destruction of the material and thus impaired product quality.

Sonotrodes known from the prior art often have geometries that result in the material to be processed, especially when special materials such as nonwovens are involved, being damaged as soon as it is fed into the gap between the sonotrode and the counter tool. In addition, known sonotrode geometries can also result in damage to the material if the material is fed into the ultrasonic processing apparatus at an angle to the sonotrode sealing surface. Material breakage and reduced product quality during the machining process are the result.

These disadvantages occur in particular when several layers of material are to be welded together, which are fed into the gap between the sonotrode and the counter tool from different directions. In this case, part of the material rubs over an edge of the sonotrode or the counter tool and is damaged as a result.

It is known from the prior art to reduce these disadvantages by reducing the force and speed used during ultrasonic processing. However, this allows fewer products to be manufactured in the same amount of time. Some materials can even only be ultrasonically processed if the material is not moved during processing.

SUMMARY OF THE INVENTION

The present invention is therefore based on the problem of providing a sonotrode or an ultrasonic welding apparatus for processing a material, which at least reduces damage to the material and at the same time does not impair the production speed.

According to the invention, this problem is solved by a sonotrode of the type mentioned above, wherein the sealing surface has a convexly curved inlet section which adjoins the lateral surface, and wherein the sealing surface has a coating at least in a section.

The convex curved inlet section of the sealing surface means that a material introduced into the gap between the sonotrode and the counter tool experiences less friction on the outer surface of the sonotrode and thus suffers less damage. The coating, which is applied to the sealing surface in sections, additionally reduces the friction between the material to be processed and the sealing surface of the sonotrode. The coating is therefore preferably applied in the areas of the sonotrode that come into contact with the material.

In one embodiment, the inlet section is curved with a radius of curvature $R_e$, preferably the radius of curvature $R_e$ is at least 3 mm, preferably at least 5 mm, and more preferably at least 7 mm.

The design of the convex curved inlet section with a constant radius of curvature is advantageous from a production engineering point of view. In addition, the claimed radius of curvature offers the advantage that in this case the friction between the material to be machined and the sonotrode is particularly effectively reduced. At the same time, the vibration behavior of the sonotrode and thus the ultrasonic processing result of the ultrasonic welding apparatus is not significantly impaired with the selected radius of curvature.

In another embodiment, the end surfaces are smaller than the side surfaces, with the convexly curved inlet section adjoining one of the two side surfaces. A sonotrode with a corresponding geometry offers the advantage that materials can be processed over a large width, the width preferably corresponding to the extent of the side surfaces.

If the feed direction is defined as the direction in which the material is guided in the gap between the sonotrode and the counter tool, then in one embodiment in particular the side surfaces are arranged one after the other perpendicular to the feed direction and the end surfaces of the sonotrode are arranged parallel to the feed direction.

In a further embodiment, the sealing surface has a convexly curved outlet section which adjoins the other of the two side surfaces, wherein preferably the outlet section is curved with a radius of curvature $R_a$, wherein particularly preferably the radius of curvature $R_a$ differs from the radius of curvature $R_e$ by no more than 50%, preferably by no more than 10%, wherein most preferably the radii of curvature $R_e$ and $R_a$ are equal. This embodiment offers the advantage that, on the one hand, it is easy to manufacture in terms of production technology and, on the other hand, the processed material can also be guided out of the ultrasonic processing apparatus without subsequently suffering any further damage due to the friction between the sonotrode and the material. In addition, this has vibration-related advantages. Furthermore, a similar radius of the inlet and outlet sections is advantageous from a vibration engineering point of view, and incorrect mounting of the sonotrode can be avoided due to the symmetrical design.

In a further embodiment, the sonotrode has a thickness d at its sealing surface-side end for which applies: $2R_e \leq d \leq 20R_e$, preferably $\leq 10R_e$, particularly preferably $\leq 5R_e$ and especially preferably $\leq 3R_e$. In other words, the sonotrode is designed at its sealing surface end in such a way that in one limiting case the entire sealing surface is convexly curved and in another case the sealing surface additionally has a region which is essentially flat, i.e. has no curvature. However, this flat region is limited in its extent to 18 times, preferably 8 times, particularly preferably 3 times and especially preferably 1 times the radius of the inlet section.

The exact design of the sealing surface can thus be adapted to different applications, for example depending on how large the area is to be that is simultaneously processed by the sonotrode.

In a further embodiment, the sonotrode has a recess extending at least in a section over the sealing surface, in which recess the coating is arranged, the coating preferably having a thickness which corresponds to a depth of the recess, so that a coated surface of the sonotrode is flush with an uncoated surface of the sonotrode.

The recess offers the advantage that the coating is anchored more stably in the sealing surface of the sonotrode. Loosening of the coating due to forces occurring during processing is thus reduced and the service life of the sonotrode according to the invention in an ultrasonic processing device is extended.

In a further embodiment, the recess has a section with continuously changing depth at its edges, so that the coating arranged in the recess has a thickness which decreases in the direction of the uncoated surface. On the one hand, this offers manufacturing advantages, and on the other hand, the coating in this case can be of higher quality, since there are no corners in the recess that may not be completely filled by the coating. Such inadequately coated areas would lead to faster destruction of the coating and thus to shorter service lives of the sonotrode.

In a further embodiment, the recess extends into one side surface and preferably into both side surfaces. This ensures that the coating also completely covers the inlet or outlet section or extends beyond these sections, thus avoiding friction between the material to be processed or machined and the sonotrode particularly effectively.

In another embodiment, the two end surfaces are spaced apart by a distance $A_s$, wherein for an extension $A_a$ of the recess in a direction extending from one of the end surfaces to the other end surface applies $0.5\ A_s < A_a \leq 1\ A_s$. That is, in this embodiment, in a limiting case, the recess extends from one of the end surfaces completely across the seal surface to the other end surface, facilitating insertion of the recess and the coating.

In another embodiment, the recess does not extend completely from one of the end surfaces to the other end surface, but at least one edge region of the end surfaces remains, which limits the coating. This also increases the stability of the coating on the sonotrode sealing surface, since forces acting on the end surfaces of the sonotrode cannot act directly on the coating.

In a further embodiment, the coating is convexly curved at least in a section. The convex curvature of the coating, just like the convex curvature of the inlet or outlet section, has the advantage that friction with the material to be processed is reduced.

In a further embodiment, the coating consists of hard metal and preferably of a non-oxide ceramic. These materials are particularly stable and are characterized by a long service life, with which long service lives of the sonotrode according to the invention can be achieved. At the same time, they offer sufficiently reduced friction with the material to be processed.

In a further embodiment, the sealing surface has at least one groove, preferably a plurality of grooves aligned parallel to each other, extending in a direction from one side surface to the other side surface.

Such grooves are typically used to guide a thread in the grooves, which is used to produce gatherable or gathered materials. For this purpose, one or more threads are arranged between two material webs and guided through the gap between the sonotrode and the counter tool. By guiding the threads in the groove of the sonotrode, ultrasonic processing of the material system takes place only in those areas of the sealing surface where no groove is formed. This generally results in a welding of the two outer layers of material, but not in a welding of the thread. This can ultimately be used to gather a material.

In one embodiment, the at least one groove is arranged exclusively in the coating. This offers the advantage that sonotrodes with standard geometries can be manufactured and only the coating has to be adapted to the respective application. The formation of the grooves in the coating also offers the advantage that the surface of the grooves is also coated and thus the material cannot be damaged even in the grooves or at edges of the grooves.

In another embodiment, the grooves are directly introduced into the sealing surface of the sonotrode and coated with a thin film coating to reduce abrasion of the material and the sonotrode.

Furthermore, the problem underlying the invention is solved by an apparatus for ultrasonic processing of a material, the apparatus comprising a sonotrode according to one of the embodiments described above, a counter tool having a sealing surface arranged opposite to the sealing surface of the sonotrode in such a way that the material to be processed can be guided during the processing through a gap formed by the two opposite sealing surfaces, and a material feed by means of which the material can be guided through the gap.

In a further embodiment, the material feed is designed in such a way that the material or at least part of the material is guided via the inlet section. In particular, when ultrasonically processing multiple layers of material that are fed into the gap between the sonotrode and the counter tool from different directions, this can prevent the material that is fed via the inlet section from being damaged.

BRIEF DESCRIPTION OF THE DRAWINGS

Further advantages, features and possible applications will become clear from the following description of two embodiments and the accompanying figures.

DETAILED DESCRIPTION OF THE INVENTION

Figure 1:
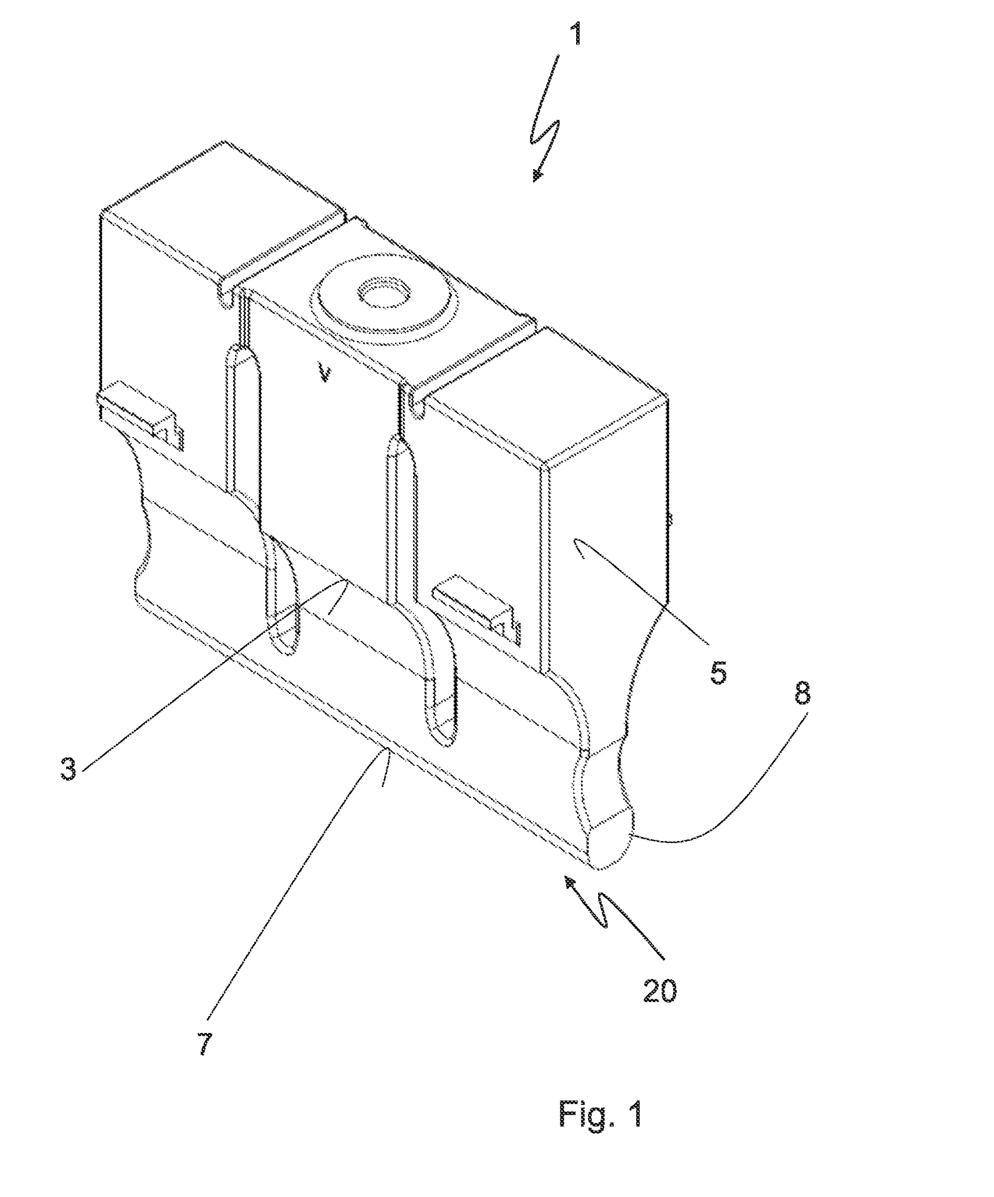
FIG. 1 shows a three-dimensional schematic representation of an embodiment of the sonotrode according to the invention.
Figure 1A:
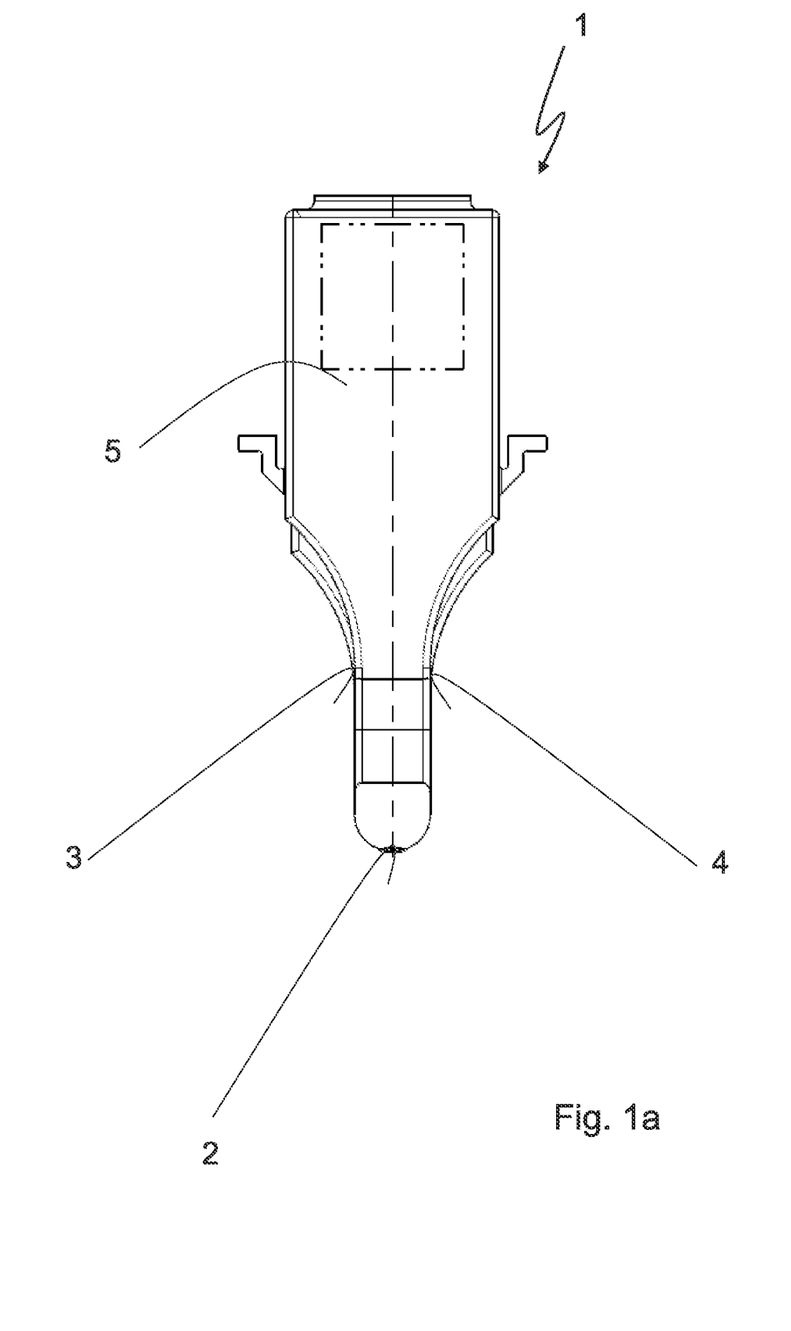
FIG. 1a shows a sectional view of the embodiment of the sonotrode according to the invention shown in FIG. 1.
Figure 1B:
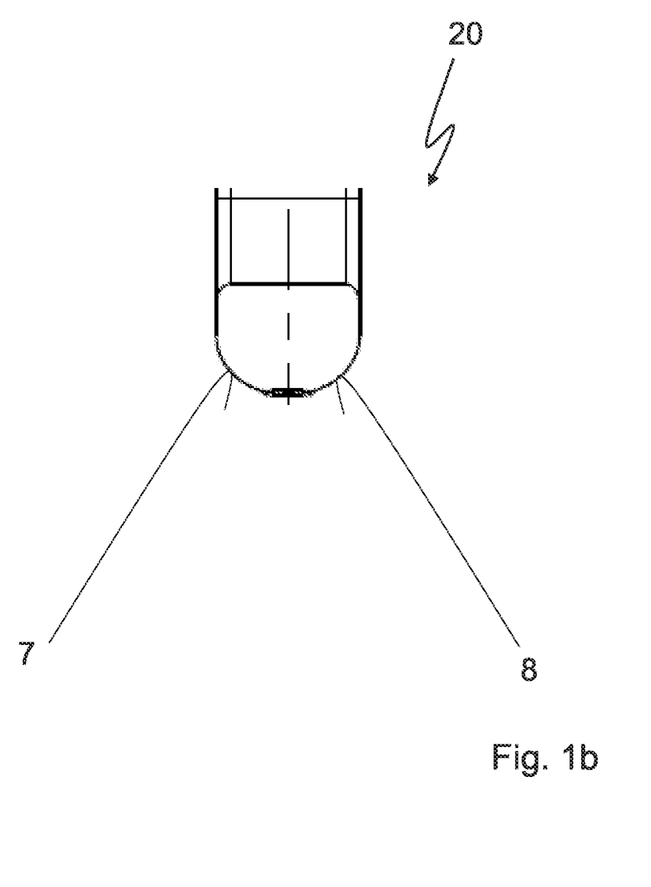
FIG. 1b shows a schematic enlargement of the sealing surface end of the sonotrode shown in FIG. 1.

According to FIGS. 1, 1a and 1b, the sonotrode 1 has a convexly curved inlet section 7 and a convexly curved outlet section 8 on its sealing surface 2. The convexly curved inlet section 7 adjoins the side surface 3 of the sonotrode 1, while the convexly curved outlet section 8 adjoins the other side 4 of the sonotrode 1. Both the convexly curved inlet section 7 and the convexly curved outlet section 8 are curved with a constant radius of curvature $R_e$ and $R_a$ of 7.5 mm, respectively. In an alternative embodiment, the inlet and outlet sections can also be curved with different radii of curvature.

The side surfaces 3, 4 connect the two end surfaces 5, 6 of the sonotrode 1 and together with these form the lateral surface of the sonotrode 1, which in turn connects a rear surface of the sonotrode 1 to the sealing surface 2 of the sonotrode 1. As shown in FIG. 1, the end surfaces 5, 6 are also smaller than the side surfaces 3, 4.

The sonotrode 1 has a thickness d at its sealing surface-side end 20 that corresponds to three times the radius of curvature $R_e$ of the inlet section 7.

Figure 2:
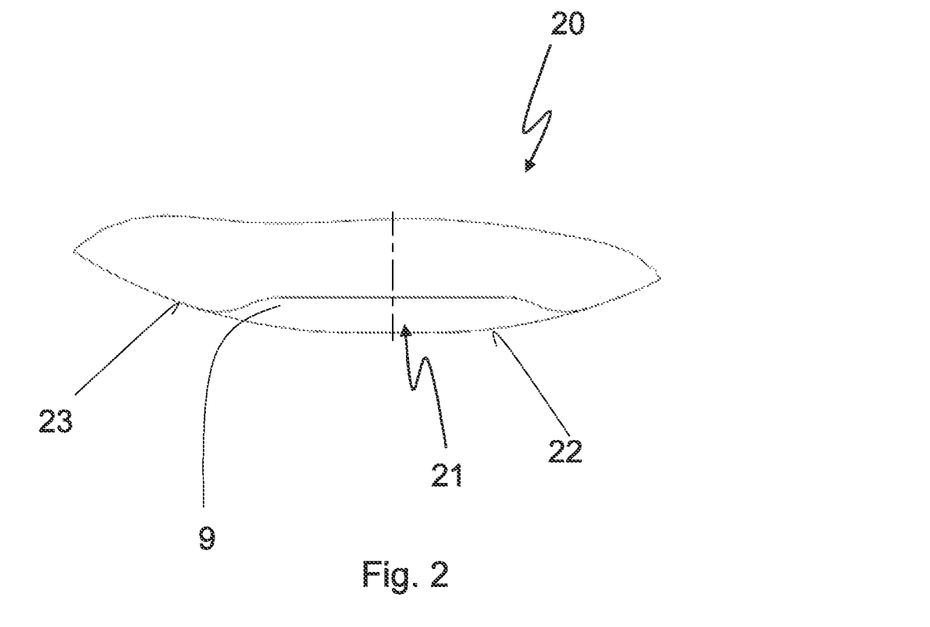
FIG. 2 shows a sectional view of an embodiment of the sonotrode with coating according to the invention.
Figure 3:
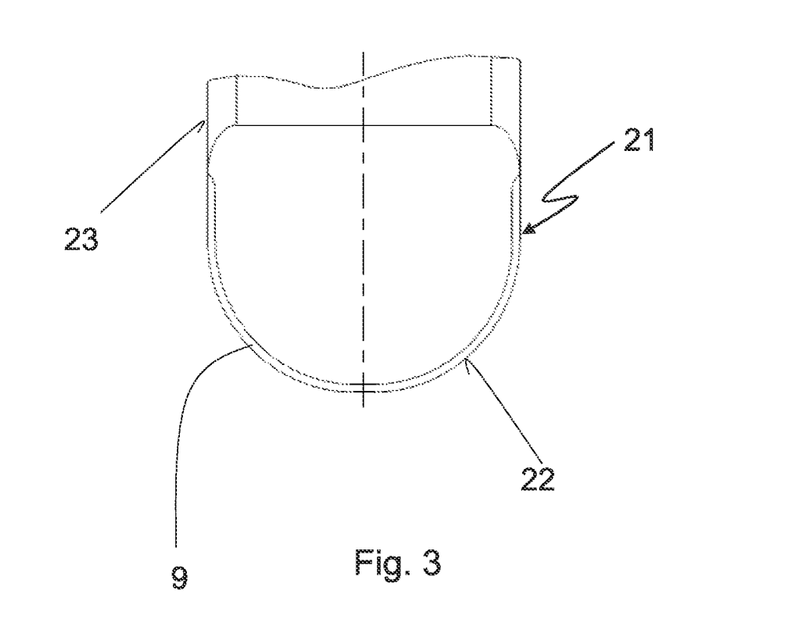
FIG. 3 shows a cross-sectional view of a section of a further embodiment of the sonotrode with coating according to the invention.

The structure described above is also present in the embodiments of the sonotrode shown in FIGS. 2 and 3. FIGS. 2 and 3 therefore show only sections of the sonotrode.

In the embodiment of the sonotrode 1 according to the invention shown in FIG. 2, the sealing surface 2 has a recess 21 in which a coating 9 is arranged. The coating 9 has a thickness corresponding to a depth of the recess 21, so that the coated surface 22 of the sonotrode 1 is flush with the uncoated surface 23 of the sonotrode 1.

Further, the recess 21 has a portion of continuously changing depth at its edges so that the coating 9 disposed in the recess 21 has a thickness that decreases toward the uncoated surface 23. In addition, the coating 4 is also convexly curved and is made of a non-oxide ceramic.

In the embodiment shown in FIG. 3, however, the recess 21 extends into both side surfaces 3, 4 of the sonotrode 1.

Figure 4:
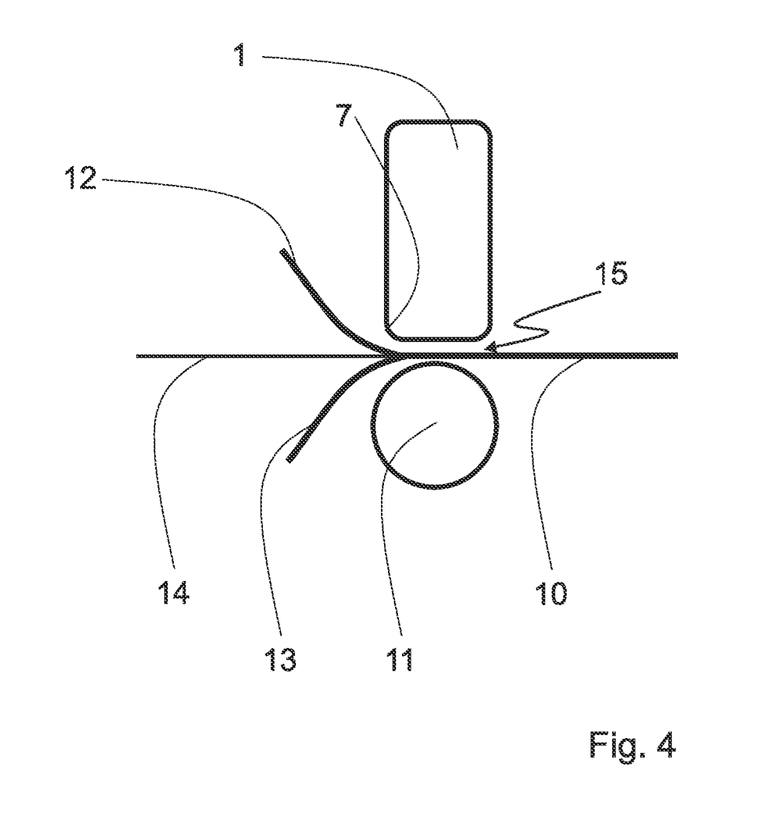
FIG. 4 shows a schematic representation of an embodiment of the ultrasonic processing device according to the invention.

In the schematic representation of an ultrasonic processing apparatus shown in FIG. 4, the sonotrode 1 according to the invention is shown together with a counter tool 11. The material system 10 to be processed is guided in the gap 15 formed between the sealing surface 2 of the sonotrode 1 and the sealing surface of the counter tool 11. In this case, the material system 10 to be processed consists of two material layers 12, 13 as well as a thread 14, which is arranged between the two material layers 12, 13. For guiding the thread 14, the sealing surface 2 of the sonotrode 1 has grooves which extend in the direction from one side surface 3 to the other side surface 4.

One of the material layers 12 is guided over the inlet section 7 of the sealing surface 2 of the sonotrode 1. The other material layer 13 is guided over the sealing surface of the counter tool 11, which is cylindrical. In this way, the material system to be processed is prevented from being damaged by the ultrasonic processing apparatus.

LIST OF REFERENCE SIGNS

1 Sonotrode
2 Sealing surface of the sonotrode
3,4 Side surfaces
5,6 End surfaces
7 Inlet section
8 Outlet section
9 Coating
10 Material
11 Counter tool
12, 13 Material layers
14 Thread
15 Gap
20 Sealing end of the sonotrode
21 Recess
22 Coated surface
23 Uncoated surface

What is claimed is:

1. A sonotrode for ultrasonic processing of a material, comprising:
    a sealing surface intended to come into contact with the material to be processed,
    a rear surface opposite the sealing surface, and
    a circumferential lateral surface connecting the sealing surface to the rear surface,
    wherein the lateral surface has two side surfaces arranged substantially parallel to one another and two end surfaces arranged substantially parallel to one another, and
    wherein the sealing surface has a convexly curved inlet section which adjoins the lateral surface, and wherein the sealing surface has a coating at least in a section.

2. The sonotrode according to claim 1, wherein the inlet section is curved with a radius of curvature $R_e$ being at least 3 mm.

3. The sonotrode according to claim 1, wherein the end surfaces are smaller than the side surfaces, the convexly curved inlet section adjoining one of the two side surfaces.

4. The sonotrode according to claim 3, wherein the sealing surface has a convexly curved outlet section which adjoins the other of the two side surfaces, wherein the outlet section is curved with a radius of curvature $R_a$, wherein the radius of curvature $R_a$ differs from the radius of curvature $R_e$ by not more than 50%.

5. The sonotrode according to claim 1, wherein the sonotrode has a thickness d at its sealing surface-side end (20), for which applies: $2R_e \leq d \leq 20R_e$.

6. The sonotrode according to claim 1, wherein the sonotrode has a recess extending at least in a section over the sealing surface, in which recess the coating is arranged, the coating having a thickness which corresponds to a depth of the recess, so that a coated surface of the sonotrode is flush with an uncoated surface of the sonotrode.

7. The sonotrode according to claim 6, wherein the recess has a section with continuously changing depth at its edges, so that the coating arranged in the recess has a thickness which decreases in the direction of the uncoated surface.

8. The sonotrode according to claim 6, wherein the recess extends into one side surface.

9. The sonotrode according to claim 6, wherein the two end surfaces are spaced apart from one another by a distance $A_S$, wherein for an extension $A_A$ of the recess in a direction extending from one of the end surfaces to the other end surface applies $0.5\,A_S < A_A \le 1 A_S$.

10. The sonotrode according to claim 1, wherein the coating is convexly curved at least in a section.

11. The Sonotrode according to claim 1, wherein the coating consists of hard metal.

12. The sonotrode according to claim 1, wherein the sealing surface has at least one groove, extending in the direction from one side surface to the other side surface.

13. The sonotrode according to claim 12, wherein the at least one groove is arranged exclusively in the coating.

14. An apparatus for ultrasonic processing of a material, comprising:
 the sonotrode according to claim 1,
 a counter tool having a sealing surface which is arranged opposite the sealing surface of the sonotrode in such a way that the material to be processed can be guided during processing through a gap formed by the two opposite sealing surfaces, and
 a material feed by means of which the material can be guided through the gap.

15. The apparatus according to claim 14, wherein the material feed is designed in such a way that the material is guided over the inlet section.

16. The sonotrode according to claim 2, wherein end surfaces are smaller than the side surfaces, the convexly curved inlet section adjoining one of the two side surfaces, wherein the sealing surface has a convexly curved outlet section which adjoins the other of the two side surfaces, wherein the outlet section is curved with a radius of curvature $R_a$, wherein the radius of curvature $R_a$ differs from the radius of curvature $R_e$ by not more than 50%, and wherein the sonotrode has a thickness d at its sealing surface-side end, for which applies: $2R_e \le d \le 20R_e$.

17. The sonotrode according to claim 16, wherein the sonotrode has a recess extending at least in a section over the sealing surface, in which recess the coating is arranged, the coating having a thickness which corresponds to a depth of the recess, so that a coated surface of the sonotrode is flush with an uncoated surface of the sonotrode, wherein the recess has a section with continuously changing depth at its edges, so that the coating arranged in the recess has a thickness which decreases in the direction of the uncoated surface, and wherein the recess extends into one side surface.

18. The sonotrode according to claim 17, wherein the two end surfaces are spaced apart from one another by a distance $A_S$, wherein for an extension $A_A$ of the recess in a direction extending from one of the end surfaces to the other end surface applies $0.5\,A_S < A_A \le 1$ As, wherein the coating is convexly curved at least in a section, and wherein the coating consists of hard metal.

19. The sonotrode according to claim 18, wherein the sealing surface has at least one groove, extending in the direction from one side surface to the other side surface, and wherein the at least one groove is arranged exclusively in the coating.

20. An apparatus for ultrasonic processing of a material, comprising:
 the sonotrode according to claim 19,
 a counter tool having a sealing surface which is arranged opposite the sealing surface of the sonotrode in such a way that the material to be processed can be guided during processing through a gap formed by the two opposite sealing surfaces, and
 a material feed by means of which the material can be guided through the gap.

* * * * *